Patented May 14, 1929.

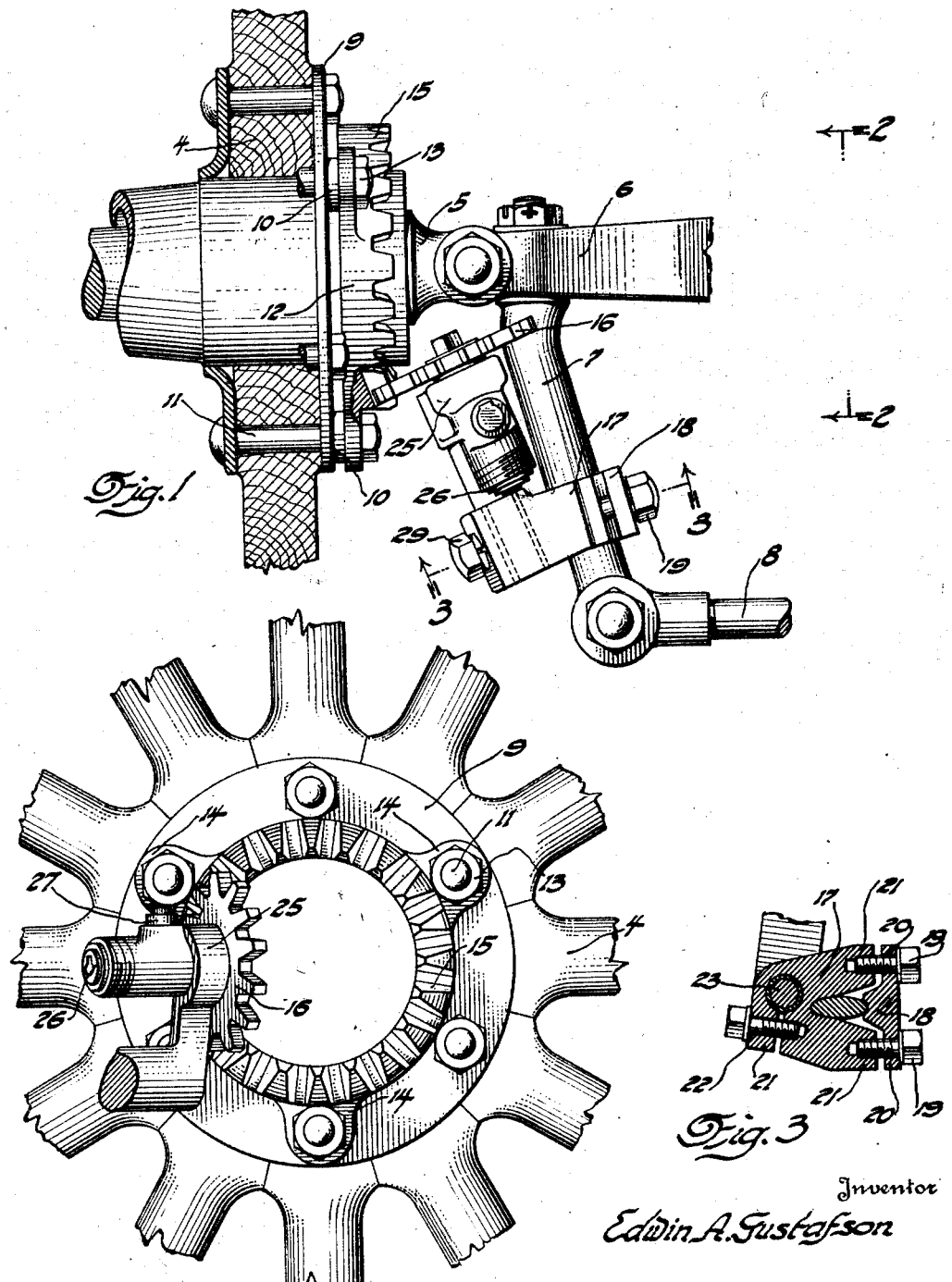

1,712,957

UNITED STATES PATENT OFFICE.

EDWIN A. GUSTAFSON, OF FLINT, MICHIGAN, ASSIGNOR TO A C SPARK PLUG COMPANY, OF FLINT, MICHIGAN, A COMPANY OF MICHIGAN.

SPEEDOMETER DRIVE.

Application filed June 7, 1926. Serial No. 114,264.

This invention relates to driving mechanisms for speedometers used on motor vehicles, particularly on Ford vehicles, and has for its object the provision of an improved driving means for speedometers.

Another object of the invention is to provide such a driving gear consisting of a beveled ring gear formed by the process of casting, to the end of effecting economy in production, preferably to one of the front wheels of the vehicle, and a flat fiber pinion rotatably mounted in a bracket.

Another object of the invention is to provide an improved speedometer drive employing such a gear element together with a two-part bracket with adjustable mounting means, and another adjusting means, independent of the latter, for effecting secondary adjustments in the journal bearing of the bracket which carries the driven pinion.

Other objects will appear hereinafter.

In the accompanying drawings:

Fig. 1 is an enlarged detail view of the invention as applied to the left front wheel of a vehicle, showing the wheel and ring gear, at the point where the driven pinion engages, partly in section.

Fig. 2 is an enlarged fragmentary elevational hub view of the inner side of the wheel, illustrating the beveled ring gear and the flat pinion in engagement therewith.

Fig. 3 is a detail view illustrating the manner of attachment of the pinion frame to the steering knuckle, and the adjustable joint between the two parts of the frame.

Similar numerals throughout the drawings refer to corresponding parts.

Referring now specifically to the drawing for a detailed description of the invention, there will be seen in Figure 1, the hub section of a wooden steering wheel 4, mounted on the stub shaft or steering knuckle 5 of the front axle 6, the knuckle 5 having an integral oblique arm 7 actuated in the usual manner by the drag link 8 for controlling the movements of the wheel 4.

It will be understood that the above described arrangement is merely for the purpose of illustration and does not in any way constitute any part of the present invention. Moreover, it will be clear that the invention is equally adapted to be used in connection with other kinds of wheels, such as, for instance, disk wheels and the like.

Mounted adjacent the interior hub ring 9, and conveniently spaced therefrom by spacers 10, carried on relatively long hub bolts 11, is a beveled ring gear 12 constructed particularly according to this invention. Nuts 13 bearing against three or more attaching ears 14, projecting from the periphery of the ring gear, and engaging the threaded ends of the bolts 11, rigidly clamp the said gear to the hub of the wheel. The teeth 15 are fashioned radially across one side of the gear, and are beveled inward, as clearly indicated in the drawing.

The driven pinion 16 is preferably made of fiber or the like, and is rotatably mounted in a two-part frame, one part of which comprising the bifurcated bracket 17, adapted to straddle the said arm 7, and being adjustably held in position by a yoke 18, preferably fashioned as illustrated in Fig. 3, carrying screws 19 engaging threaded apertures 20 formed in each leg 21 of the bracket 17.

Said bracket 17 is also formed with a split transverse bearing 21, and means such as clamping screw 22 is provided for taking up on the bearing. There is mounted in the bearing 21, a spindle 23 which supports the other member of the said two-part frame, the same including a pinion shaft bearing 25 in which is journaled the stub shaft 26, carrying the said pinion 16. Bearing 25 may be provided with a grease cup 27.

From the construction and arrangement of parts thus described there has been provided a gear element formed by casting, which will cooperate with the usual fiber pinion. By the use of a cast bevel gear, considerable economy in manufacture is effected with results that are entirely satisfactory.

From the foregoing, it will be seen that there has been provided a construction, arrangement and combination of various parts which fully attains the object hereinbefore set out.

Modifications of the above may be made within the spirit and scope of the invention.

What I claim is:

In a vehicle, a swivelling wheel, an arm for swivelling said wheel, a bevelled gear on said wheel, a bracket clamped to said arm, said bracket having an opening with its axis substantially parallel with said arm, a spindle in said opening, means to clamp said spindle in positions of axial and rotatable adjustment, an angular arm on said spindle adjacent said bevelled gear, said arm having a bearing opening substantially parallel with the axis of said spindle, a shaft rotatably mounted in said last-named bearing opening and a pinion on said shaft engaging and driven by said bevelled gear.

In testimony whereof I affix my signature.

EDWIN A. GUSTAFSON.